March 19, 1963
B. E. TRAUT
3,081,974
SEALING MEANS FOR GATE VALVES
Filed Sept. 8, 1959
2 Sheets-Sheet 1
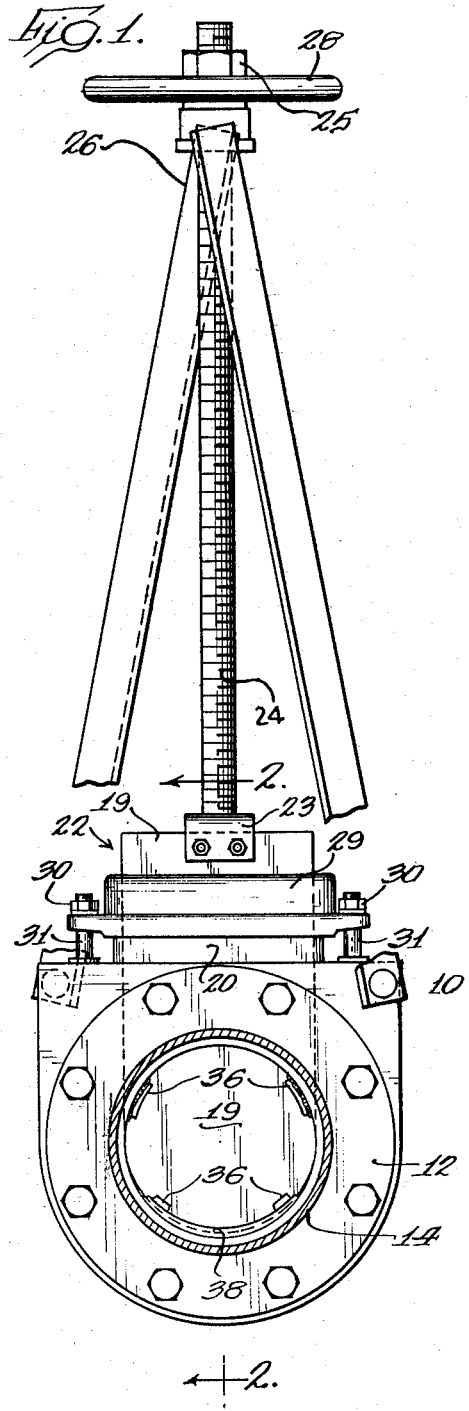
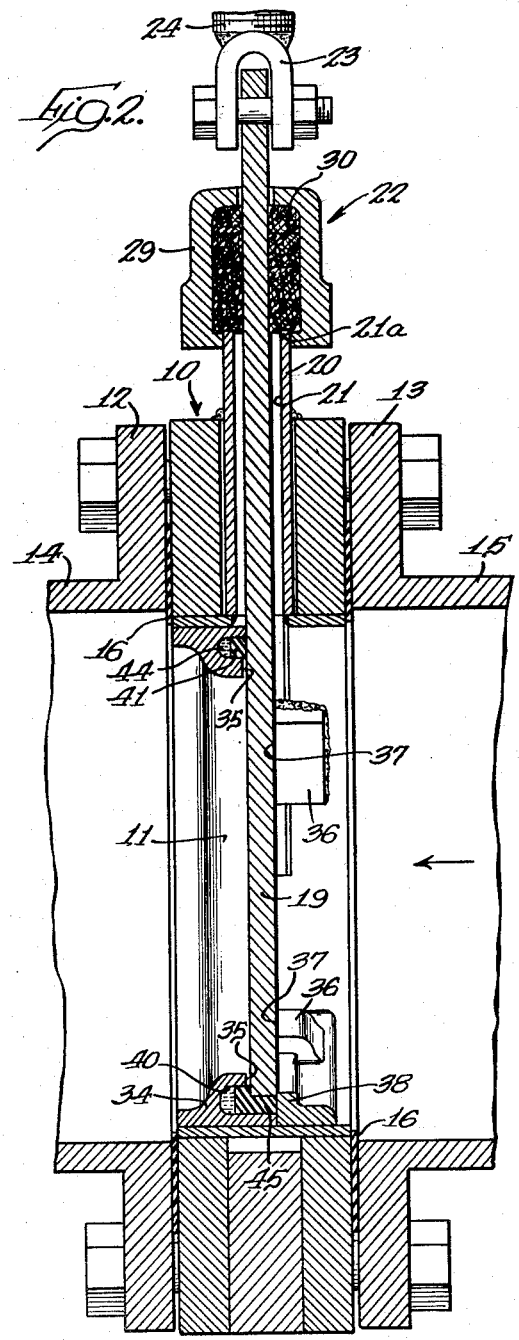
INVENTOR.
Bernard E. Traut
BY
Wolfe, Hubbard, Voit & Osann
Attys.

March 19, 1963 B. E. TRAUT 3,081,974
SEALING MEANS FOR GATE VALVES
Filed Sept. 8, 1959 2 Sheets-Sheet 2
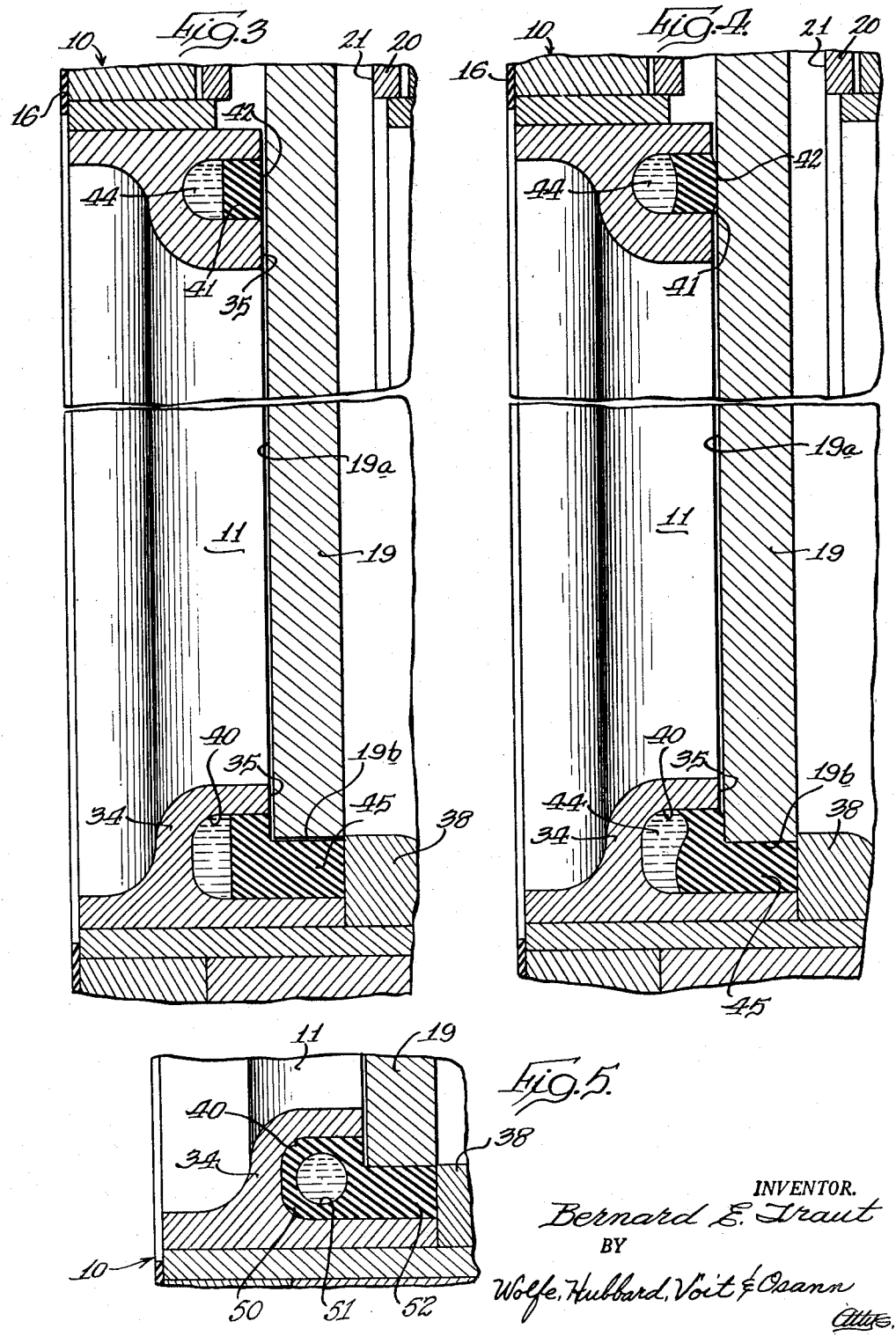
INVENTOR.
Bernard E. Traut
BY
Wolfe, Hubbard, Voit & Osann
Attys.

United States Patent Office
3,081,974
Patented Mar. 19, 1963

3,081,974
SEALING MEANS FOR GATE VALVES
Bernard E. Traut, St. Cloud, Minn., assignor to Dezurik Corporation, Sartell, Minn., a corporation of Minnesota
Filed Sept. 8, 1959, Ser. No. 838,467
8 Claims. (Cl. 251—172)

The present invention relates in general to valves and in particular to valves of the type having a blade, gate or similar element movable transversely across a passageway in the valve body to close or open the valve. Such valves in general may be of the class known in the art as plug or gate valves.

In many conventional valves manufactured for industrial uses, the final dimensions and relative positions of the parts are such that some slight leakage may occur even when the valve is fully closed. In many applications such slight leakage is not objectionable and the standard valves entirely fulfill their intended purpose. Such standard valves are not unduly expensive since the manufacturing tolerances of the interfitting parts need not be extremely small where some leakage may be tolerated. Yet, the need exists in certain specialized applications for valves which will provide an absolute fluid seal and prevent all leakage of fluid therethrough when they are fully closed. It is with the latter type of valve that the present invention is concerned.

In order to produce valves which will not leak when fully closed, very complex and expensive valve constructions have been used in the past. It is, in contrast, the general aim of the present invention to provide an improved and markedly simplified and low cost valve structure which affords positive sealing of the valve when it is closed.

Another object of the invention is to realize such an improved valve which may utilize a conventional movable element, i.e., gate or blade.

Still another object is to provide an absolutely tight sealing valve of the type noted above and which may be conventionally constructed except for a special but very simple valve seat assembly.

An additional object of the invention is to provide an improved valve sealing means arranged to be actuated by forces transmitted through pressurized fluid and created in the first instance by the movable element or gate as an incident to its being moved to a closed position.

It is still another object to provide improved valve sealing means including an actuating part which serves also as a cushioning stop for the movable element or gate, preventing damage to both the element and the valve seat.

And yet another object is to create such a valve in which the seal-actuating means serves also to prevent foreign material from building up and packing in the bottom of the valve seat.

Other objects and advantages will become apparent as the following description proceeds, taken in conjunction with the accompanying drawings, in which:

FIGURE 1 is an elevational view of a gate valve embodying the features of the present invention;

FIG. 2 is an enlarged vertical section taken substantially along the line 2—2 in FIG. 1;

FIGS. 3 and 4 are enlarged sections corresponding to part of FIG. 2 and respectively showing the sealing means in its relaxed and actuated conditions; and FIG. 5 is a fragmentary sectional view, similar to a part of FIG. 3, but showing a modified embodiment of the invention.

While the invention has been shown and will be described in some detail with reference to particular embodiments thereof, there is no intention that it be limited to such detail. On the contrary, it is intended here to cover all modifications, alternatives and equivalents falling within the spirit and scope of the invention as defined by the appended claims.

Turning first to FIGS. 1 and 2, the exemplary gate valve there shown has a main body 10 defining a circular passageway 11 therethrough for flow of fluid. Flanges 12 and 13 of pipes 14 and 15 may be bolted to the valve body, with appropriate sealing gaskets 16 interposed so that the flow of fluid between the pipe 15 and the pipe 14 is controlled by the opening or closing of the valve.

As shown in FIGS. 1 and 2, the valve is almost fully closed. A movable valve element or gate blade 19 extends transversely across the passageway 11, and has a rounded lower edge which may engage and mate with the bottom of the round passageway 11, fully closing the latter. To afford movement and guiding of the blade between opened and closed positions, a hollow sleeve 20 is formed as a part of the valve body 10, the sleeve defining a channel 21 which is transverse to the axis of the passageway 11 and through which the upper end of the gate blade 19 extends. The blade 19 also extends through a packing box assembly 22, and is connected at its upper end by a clevis 23 to the lower end of an elevating screw 24. This screw is cooperatively engaged with a nut 25 rotatably mounted in a stationary frame 26 and connected with a hand wheel 28. Rotation of the hand wheel 28 in one direction or the other causes the nut 25 to raise or lower the screw 24 and thus to move the gate blade 19 toward opened or closed positions relative to the valve passageway 11.

Despite this freedom of the blade 19 to move vertically as viewed in FIG. 2, fluid cannot leak out of the valve body through the channel 21. The packing assembly 22 includes an inverted packing box 29 containing packing material 30 which is compressed by the upper edges 21a of the sleeve 20 when the box 29 is drawn downwardly by nuts 30 engaged with threaded studs 31 fixed to the valve body. This compression of the packing material 30 makes it sealingly embrace the blade 19 even though the latter has freedom to slide up and down.

The main passageway 11 in the valve body 10 is bordered by an annular valve seat 34 which may be fastened in place or formed integrally with the valve body. This valve seat presents a seating surface 35 disposed transversely of the passageway 11 and opposite one side surface of the blade 19 when the latter is lowered to its closed position. Since the normal direction of fluid flow or pressure drop through the valve is that indicated by the arrow in FIG. 2, pressure in the pipe 15 when the valve is closed will urge the blade 19 toward the seating surface 35.

The seat surface 35 also assists in guiding the gate blade 19 as the latter is moved vertically, so that its lower end will always engage about the same point in the lower portion of the valve seat. This guiding is augmented by a plurality of lugs 36 which are welded to the interior of the body 10 within the passageway 11 at circularly spaced points to present guiding surfaces 37 disposed opposite the left side of the blade 19 as viewed in FIG. 2. It will be noted from FIG. 1 that the lowermost guide lugs 36 are formed on a rib 38 which is located in the bottom of the passageway and which extends over an arc considerably less than 180°. The purpose of this rib 38 will become clear as the description proceeds.

With the gate blade 19 so mounted to be moved between opened and closed positions relative to the passageway 11, an absolutely fluid tight seal will not ordinarily be created to prevent leakage of fluid from the pipe 15 to the pipe 14 when the blade 19 is fully closed.

The spacing between the seat surface 35 and the surfaces 37 of the guide lugs is slightly greater than the thickness of the gate 19, so that the latter has some freedom for movement. The machining of the parts and their assembly, for example by welding, makes it normal that this valve construction as thus far described have some leakage when the blade is in its fully closed position.

In accordance with the present invention, the illustrated gate valve is provided with means to make it effect an absolute seal against leakage of fluid when the blade 19 is in its closed position, notwithstanding the looseness of fit of the relative parts. In order to effect this sealing action, the invention contemplates the provision or formation of a groove 40 in the seat member 34, such groove being defined in the sealing surface 35 so that it opens in a direction parallel to the axis of the passageway 11 and toward the adjacent surface 19a of the blade 19. It will be apparent that the groove 40 is annular in shape, that is, it extends completely around the passageway 11 so that the blade 19 when fully closed comes into registry with the mouth of the groove.

Disposed within the groove 40 is a ring 41 of deformable resilient material, such as rubber. This ring is held in place by a suitable adhesive agent or glue, and presents an outer surface 42 which is normally substantially flush with the seat surface 35. The ring 41 is so constructed and disposed in the groove 40 as to define a closed space 44. As shown in FIGS. 2-4, the ring 41 is fixed in the mouth of the groove 40 and, together with the inner walls of the groove, defines the circular space 44. This closed space is completely sealed after being filled with a substantially incompressible fluid or semi-solid which has the pressure-transmitting qualities of conventional fluids. The fluid employed may be any one of a variety of suitable fluids available in the art; indeed, any fluid such as water or oil which is not damaging to the material of the resilient ring 41 may be used.

FIG. 3 illustrates the condition of the resilient ring 41 when the gate 19 is retracted slightly from its fully closed position. It will be seen that the surface 42 of the ring 41 is withdrawn from the opposite surface 19a of the blade 19. Thus no binding or rubbing wear occurs between the resilient ring 41 and the blade 19 as the latter is moved between its upper and lower positions.

In order to produce a positive sealing action when the blade 19 is fully lowered, a deformable, resilient skirt 45 is disposed around a portion of the passageway 11 and positioned so as to be deformed by the edge of the blade 19 as the latter reaches its fully closed position. As here shown, the skirt 45 is preferably formed as an integral portion of the resilient ring 41, such skirt extending over an arc of less than 180° around the ring 41, and projecting from the ring and out of the groove 40 so as to lie beneath the bottom edge portion 19b of the blade 19 as the latter approaches its fully closed position (FIG. 3). With this arrangement, as the blade 19 is lowered to its final position (FIG. 4), the skirt 45 is deformed by the edge of the blade 19, is restrained by the adjacent rib 38 on the left, and thus squeezes inwardly to deform the adjacent portions of the ring 41. Accordingly, the lower portion of the space 44 (FIG. 4) is reduced in volume and the pressure of the fluid within that space is materially increased. This, in turn, tends to deform the ring 41 outwardly of the groove and into firm sealing contact (indicated at 46 in FIG. 4), between the normally separated surfaces 42 and 19a of the ring 41 and blade 19.

With the blade 19 fully closed as shown in FIG. 4, its lower edge is, first of all, cushioned by the skirt 45 against wearing contact with the seat 34 at the bottom of the passageway 11. Secondly, the lower edge 19b of the blade 19 is sealed against leakage of fluids therearound by virtue of the resilient, flexible nature of the skirt 45 which is under compression. Thirdly, this compression of the skirt 45 serves to actuate, through the hydraulic action of the compressed fluid 44, the sealing ring 41 so that it is positively extended outwardly of the groove 40 and into very firm sealing contact with the blade 19. Thus, a very simple valve construction is achieved which has positive sealing means actuated and deactuated automatically as an incident to movement of the gate blade between its fully closed or partially opened position.

Another important advantage accrues from the construction of the sealing means as indicated above. When the blade 19 is opened and liquid is flowing through the pipes 15, 14 (FIG. 2), foreign matter may accumulate in the bottom of the passageway 11, especially since the seat 35 forms a ridge or ledge opposing the flow of liquid. As the gate 19 is repeatedly moved to a closed position, this foreign matter, and particularly fibrous components therein, tends to be compressed and packed into the bottom of the passageway 11, building up such an accumulation that eventually the blade cannot fully close. Such spurious build-up of foreign matter is prevented by the present sealing means. If foreign matter should accumulate on top of the skirt 45 and the edge of the blade 19 moved downwardly against such foreign matter, the skirt 45 rises resiliently when the blade 19 is again raised. This tends to crack or break away the foreign matter which was previously compressed between the blade and the skirt, so that the latter is washed away in the flow through the valve. Thus, continued compression and build-up of foreign matter in the bottom of the valve seat cannot occur because the skirt 45 assures that any material trapped by closing of the blade is washed away the next time that the blade is opened.

Referring now to FIG. 5, a modified form of sealing means is there illustrated, involving substantially the same valve construction as previously noted above. The valve body 10, passageway 11, gate blade 19, seat 34 and groove 40 are all the same as previously described in connection with FIGS. 1-4.

In FIG. 5, however, a flexible, deformable ring 50 is fixed in the groove 40, such ring substantially filling the groove. The ring 50 is made with an annular space 51 therein, such space being filled with a captive fluid. This fluid-filled ring 50 may be separately manufactured and simply slipped into the groove 40 during assembly of the valve and held in place by suitable retaining means such as an adhesive. Extending from the bottom portion of the ring 50 is a skirt 52 which is similar to and performs the functions of the skirt 45 previously described. As the blade 19 is fully lowered to squeeze the skirt 52, the lower portion of the ring 50 is compressed so that the fluid in the space 51 forces the ring into firm sealing contact with the blade.

I claim as my invention:

1. In a valve, the combination comprising a body having a substantially circular passageway therethrough and bordered by an annular seat, means defining an annular groove in said seat which opens in a direction parallel to the axis of said passageway, a movable valve element, means mounting said element in said body for movement to advance and retract one edge of the element across said passageway between positions opening and closing the latter, means guiding said element to make the surface thereof move across and register with the mouth of said groove as the element moves to its closed position, a deformable, yieldable annular ring disposed in said groove and defining a closed annular space, a substantially incompressible fluid in said space, and a skirt formed as an integral portion of said ring and projecting axially from said groove at a point to be squeezed by said one edge of said element when the latter reaches its closed position.

2. In a valve, the combination comprising a body having a passageway therethrough and bordered by an annular seat, said seat having a surface transverse to the passageway and an annular groove with uninterrupted side walls formed in such surface, a gate blade, means mounting said blade in said body for movement to advance and retract one edge of the blade transversely across the passageway between positions closing and opening the latter, said blade being guided during its movement by said seat surface on one side and guide means carried by said body on the other side, a resilient, flexible ring disposed in said groove and defining an annular closed space, a substantially incompressible fluid in said space, a resilient, deformable skirt disposed in said passageway and in front of said groove, said skirt extending less than 180° around said passageway and being positioned to be compressed and sealingly engaged by the one edge of said blade as the latter reaches its closed position, said skirt also serving when compressed by said blade as means to deform the adjacent portion of said ring, so that said fluid forces the remaining portion of said ring into intimate, sealing contact with the surface of said blade.

3. The combination set forth in claim 2, further characterized in that said skirt is an integral part of said ring.

4. The combination set forth in claim 2, further characterized in that said ring is disposed in the mouth of said groove and together with the inner wall of said groove defines said space.

5. The combination set forth in claim 2, further characterized in that said ring is hollow and totally defines said closed space with said fluid held captive in such space.

6. In a valve having a body defining a passageway therethrough which is bordered by a valve seat, and a blade guided and movable in said body adjacent the seat and transversely of said passageway between positions opening and closing the latter, the improvement which comprises, in combination, means defining in said seat a groove which opens toward said blade, a resilient ring disposed in said groove and defining a closed space, a liquid captive in said space, a cushion disposed in said passageway and positioned to be engaged and compressed by the edge of said blade as the latter reaches its closed position, said cushion being adjacent to a portion of said ring to deform the latter inwardly of said groove as an incident to deformation of the cushion by the blade edge, whereby the ring is urged outwardly of said groove and into sealing contact with said blade.

7. In a valve, the combination comprising, a body having a substantially circular passageway therethrough and bordered by an annular seat member, a movable valve member, means defining an annular groove in one of said members which opens in a direction parallel to the axis of said passageway, means mounting said valve member in said body for movement to advance and retract one edge of the valve member across said passageway between positions opening and closing the latter, means guiding said valve member to make the surface thereof move across said seat member as the valve member moves to its closed position so that the mouth of said groove formed in one of said members is registered with the other of said members, a deformable, yieldable annular ring disposed in said groove and defining a closed annular space, a substantially incompressible fluid in said space, and a deformable skirt formed as an integral portion of said ring and projecting from said groove at a point to be squeezed by said one edge of said valve member when the latter reaches its closed position.

8. In a valve, the combination comprising, a body having a substantially circular passageway therethrough and bordered by an annular seat member, a movable valve member, means defining an annular groove in one of said members which opens in a direction parallel to the axis of said passageway, means mounting said valve member in said body for movement to advance and retract one edge of the valve member across said passageway between positions opening and closing the latter, means guiding said valve member to make the surface thereof move across said seat member as the valve member moves to its closed position so that the mouth of said groove formed in one of said members is registered with the other of said members, a deformable, hollow annular ring disposed in said groove, a substantially incompressible fluid totally confined within said hollow annular ring, and a deformable skirt formed as an integral portion of said ring and projecting from said groove at a point to be squeezed by said one edge of said valve member when the latter reaches its closed position.

References Cited in the file of this patent

UNITED STATES PATENTS

| | | |
|---|---|---|
| 2,229,871 | Penick | Jan. 28, 1941 |
| 2,510,442 | Volpin | June 6, 1950 |
| 2,567,032 | Schmidt | Sept. 4, 1951 |
| 2,726,842 | Seamark | Dec. 13, 1955 |
| 2,734,714 | Knox | Feb. 14, 1956 |
| 2,911,188 | Anderson | Nov. 3, 1959 |

FOREIGN PATENTS

| | | |
|---|---|---|
| 1,114,153 | France | Dec. 12, 1955 |